(12) United States Patent
Frota de Souza

(10) Patent No.: US 10,543,538 B2
(45) Date of Patent: Jan. 28, 2020

(54) EXPANSION SLEEVES AND ASSOCIATED CHUCKS

(71) Applicant: Kennametal Inc., Latrobe, PA (US)

(72) Inventor: Ruy Frota de Souza, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/822,977

(22) Filed: Nov. 27, 2017

(65) Prior Publication Data
US 2019/0160551 A1  May 30, 2019

(51) Int. Cl.
*B23B 31/30* (2006.01)

(52) U.S. Cl.
CPC ....... *B23B 31/305* (2013.01); *Y10T 279/1216* (2015.01); *Y10T 279/1241* (2015.01); *Y10T 279/1283* (2015.01); *Y10T 279/17111* (2015.01)

(58) Field of Classification Search
CPC .......... B23B 31/305; Y10T 279/12; Y10T 279/1216; Y10T 279/1241; Y10T 279/1283; Y10T 279/1249
See application file for complete search history.

(56) References Cited

U.S. PATENT DOCUMENTS

| | | | | |
|---|---|---|---|---|
| 3,034,408 A * | 5/1962 | Kampmeier | ........... | B23Q 1/287 279/4.03 |
| 3,202,432 A * | 8/1965 | Cameron | ............ | B23B 31/305 242/576.1 |
| 3,540,346 A * | 11/1970 | Jones | .................... | B23B 31/305 408/239 R |
| 4,111,569 A * | 9/1978 | Mengel | ................ | B23B 31/305 279/2.08 |
| 4,317,577 A * | 3/1982 | Cameron | .............. | B23B 31/305 242/571.2 |
| 4,677,792 A * | 7/1987 | Speidel | ................... | B24B 45/00 242/571.1 |
| 4,705,439 A * | 11/1987 | Hoyle | .................. | B23B 31/202 279/46.4 |
| 4,781,102 A * | 11/1988 | Scerbo | ................. | F15B 15/262 91/41 |
| 5,054,756 A * | 10/1991 | Riemscheid | ........ | B21D 39/203 269/48.1 |
| 5,088,746 A * | 2/1992 | Dietz | ................... | B23B 31/305 24/463 |
| 6,488,285 B1 * | 12/2002 | Allard | .................. | B23B 31/305 279/102 |
| 10,107,076 B2 * | 10/2018 | Muscroft | .............. | E21B 23/006 |
| 2011/0156363 A1 * | 6/2011 | Haimer | .................. | B23B 31/02 279/20 |

FOREIGN PATENT DOCUMENTS

DE        2517997 A1 * 11/1976  .......... B23B 31/305

* cited by examiner

*Primary Examiner* — Eric A. Gates
(74) *Attorney, Agent, or Firm* — Matthew S. Bedsole

(57) ABSTRACT

In one aspect, expansion sleeves for pressure-activated tool holder apparatus are described herein. An expansion sleeve, for example, comprises a first end, a second end and a longitudinal axis extending between the first end and the second end. A first set of fluid chambers are proximate the first end of the sleeve and a second set of fluid chambers are proximate the second end, wherein fluid channels extend along the longitudinal axis to connect radially offset fluid chambers of the first and second sets.

18 Claims, 10 Drawing Sheets

> US 10,543,538 B2

EXPANSION SLEEVES AND ASSOCIATED CHUCKS

FIELD

The present invention relates to rotary tool holder apparatus and, in particular, to expansion sleeves and associated pressure activated chuck assemblies.

BACKGROUND

Tool holder assemblies configured for use with interchangeable cutting or machining tools provide a number of process efficiencies. A smaller number of machine spindles, for example, can be employed for a larger variety of machining operations, and downtime between various cutting tasks can be reduced by decreased need to switch apparatus for each machining application. In order to realize the foregoing efficiencies, tool coupling systems must provide secure connection with minimal tool change downtime while maintaining desired operating tolerances.

In many applications, hydraulic chucks are employed in rotary tool holder assemblies. A hydraulic chuck generally comprises an expansion sleeve defining a clamping bore. A single, circumferential expansion chamber resides between the sleeve and chuck body. Tightening a piston clamping screw exerts force on a pressure piston, which in turn pressurizes hydraulic fluid or silicone fluid residing in the chuck body. Such pressure causes the expansion sleeve to compress around the tool shank, creating a highly concentric clamping force with high torque transmission capability. However, hydraulic chucks can suffer from low radial stiffness when a side force is applied to a tool at a certain distance from the sleeve, resulting from hydraulic fluid displacement from side to side in the circumferential chamber.

SUMMARY

In one aspect, expansion sleeves for pressure activated tool holder apparatus are described herein which, in some embodiments, increase radial stiffness thereby improving performance of rotary cutting tools. An expansion sleeve, for example, comprises a first end, a second end and a longitudinal axis extending along a bore between the first end and the second end. A first set of fluid chambers are proximate the first end of the sleeve and a second set of fluid chambers are proximate the second end, wherein fluid channels extend along the longitudinal axis to connect radially offset fluid chambers of the first and second sets. As described further herein, each fluid chamber of the first set can be independently connected with a fluid chamber of the second set via an independent fluid channel, wherein the connected chambers are radially offset from one another.

In other embodiments, an expansion sleeve for tool holder apparatus comprises a first end, a second end and a longitudinal axis extending along a bore between the first end and the second end. Independent fluid chambers extend between the first end and the second end and are radially arranged around the bore. In some embodiments, two or more of the independent fluid chambers are connected by fluid channels.

In another aspect, chucks are provided. In some embodiments, a chuck comprises a body comprising a central bore and an expansion sleeve positioned in the central bore, the expansion sleeve having a first end, a second end and longitudinal axis extending between the first end and the second end. A first set of expansion chambers are proximate the first end of the sleeve, and a second set of expansion chambers are proximate the second end, wherein fluid channels extend along the longitudinal axis to connect radially offset expansion chambers of the first and second sets. In some embodiments, each expansion chamber of the first set can be independently connected with an expansion chamber of the second set via an independent fluid channel, wherein the connected chambers are radially offset from one another. In this way, fluid such as hydraulic fluid, organic fluid or silicone fluid, is shared between expansion chamber pairs and does not reside in a single circumferential chamber as in prior hydraulic chuck designs. Limiting fluid to expansion chamber pairs can limit fluid displacement when a force is applied to the tool held by the chuck, thereby increasing radial stiffness and grip of the chuck.

In a further aspect, a chuck comprises a body comprising a central bore and an expansion sleeve positioned in the central bore, the expansion sleeve having a first end and a second end and a central axis extending between the first end and the second end. Independent expansion chambers extend between the first end and the second end and are radially arranged around the central axis.

These and other embodiments are described in greater detail in the following detailed description.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

Figure 1:
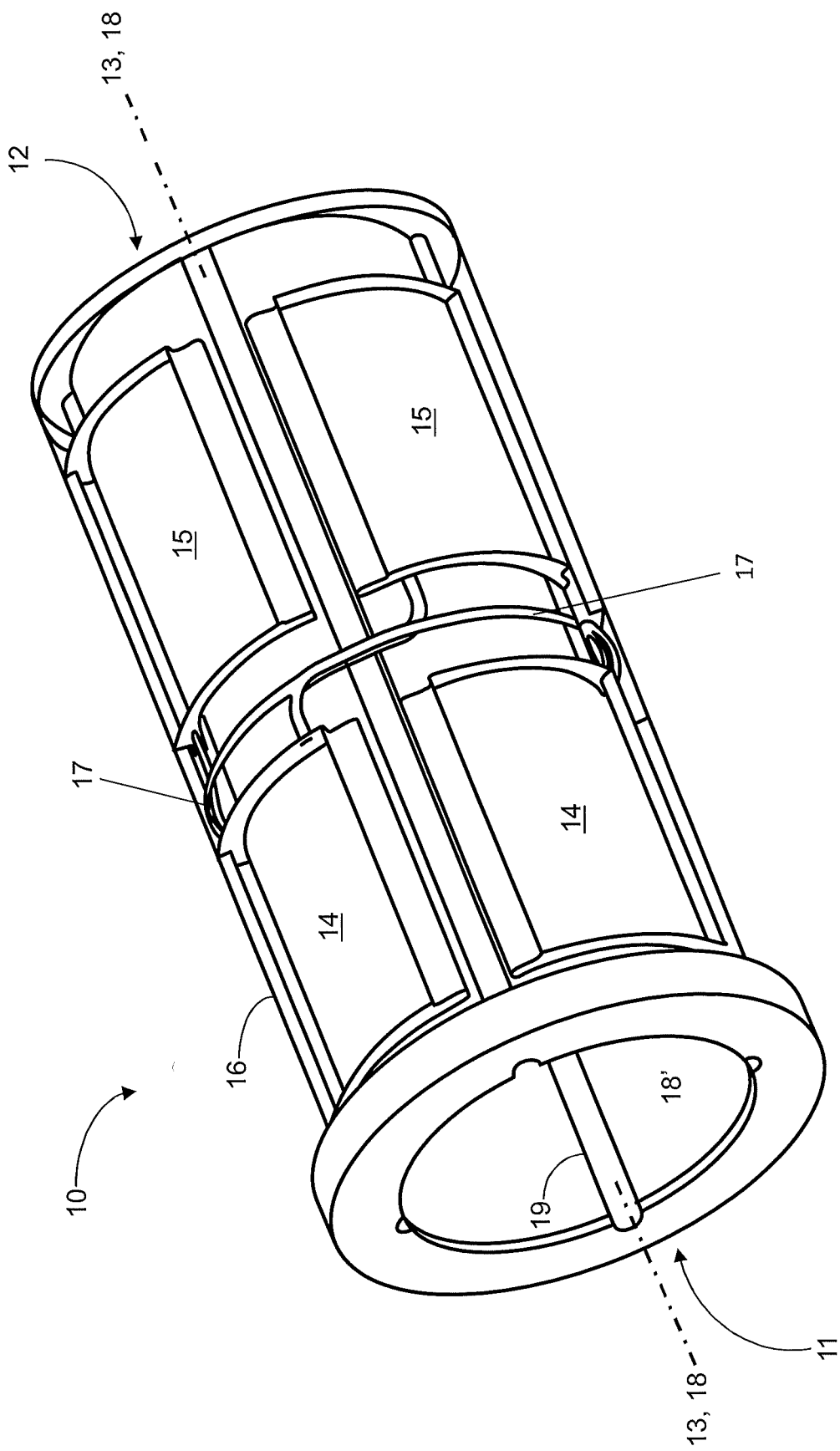
FIG. 1 illustrates a perspective cut-away view of an expansion sleeve according to some embodiments.

FIG. 1 illustrates a perspective cut-away view of an expansion sleeve according to some embodiments. As illustrated in FIG. 1, the expansion sleeve 10 comprises a first end 11, a second end 12 and a longitudinal axis 13 extending along a bore 18 between the first end 11 and the second end 12. A first set of fluid chambers 14 are proximate the first end 11 and a second set of fluid chambers 15 are proximate the second end 12. Fluid chambers 14 of the first set are circumferentially arranged over the outer surface 16 of the expansion sleeve 10. Similarly, fluid chambers 15 of the second set are circumferentially arranged over the outer surface 16 of the expansion sleeve 10. As illustrated further in FIG. 3, four fluid chambers 14 comprise the first set and four fluid chambers 15 comprise the second set. However, any desired number of fluid chambers can be circumferentially arranged over the outer surface. In some embodiments, for example, 3, 6, 8 or greater than 8 fluid chambers comprise a set at one end of the expansion sleeve.

In the embodiment of FIG. 1, the fluid chambers 14, 15 extend linearly along the longitudinal axis 13. Fluid channels 17 also extend along the longitudinal axis 13 and connect radially offset chambers 14, 15 of the first and second sets. As illustrated in FIG. 1, each fluid chamber 14 of the first set can be independently connected with a fluid chamber 15 of the second set via an independent fluid channel 17, wherein the connected chambers exhibit radial offset.

Radial offset between connected fluid chambers 14, 15 of the first and second sets can be selected according to several considerations including, but not limited to, the total number of fluid chambers 14, 15 present, shape of the fluid chambers 14, 15 and the circumferential arrangement of the fluid chambers 14, 15 at the respective first 11 and second 12 ends of the expansion sleeve 10. In some embodiments, for example, radial offset between connected first 14 and second 15 chambers is less than 180 degrees. Radial offset between first and second connected chambers can be measured from a center point in the first chamber to a center point in the second chamber. In other embodiments radial offset is greater than 180 degrees. In further embodiments, connected first 14 and second 15 chambers can be radially offset by 170 degrees to 190 degrees. For example, a chamber 14 of the first set can be radially offset from a connected chamber 15 of the second set by about 180 degrees.

The expansion sleeve of FIG. 1 also comprises grooves 19 extending along the bore surface 18'. In the embodiment of FIG. 1, the grooves 19 extend linearly along the bore surface 18'. The grooves 19 can transport coolant to the rotary cutting tool during cutting operations.

Figure 2:
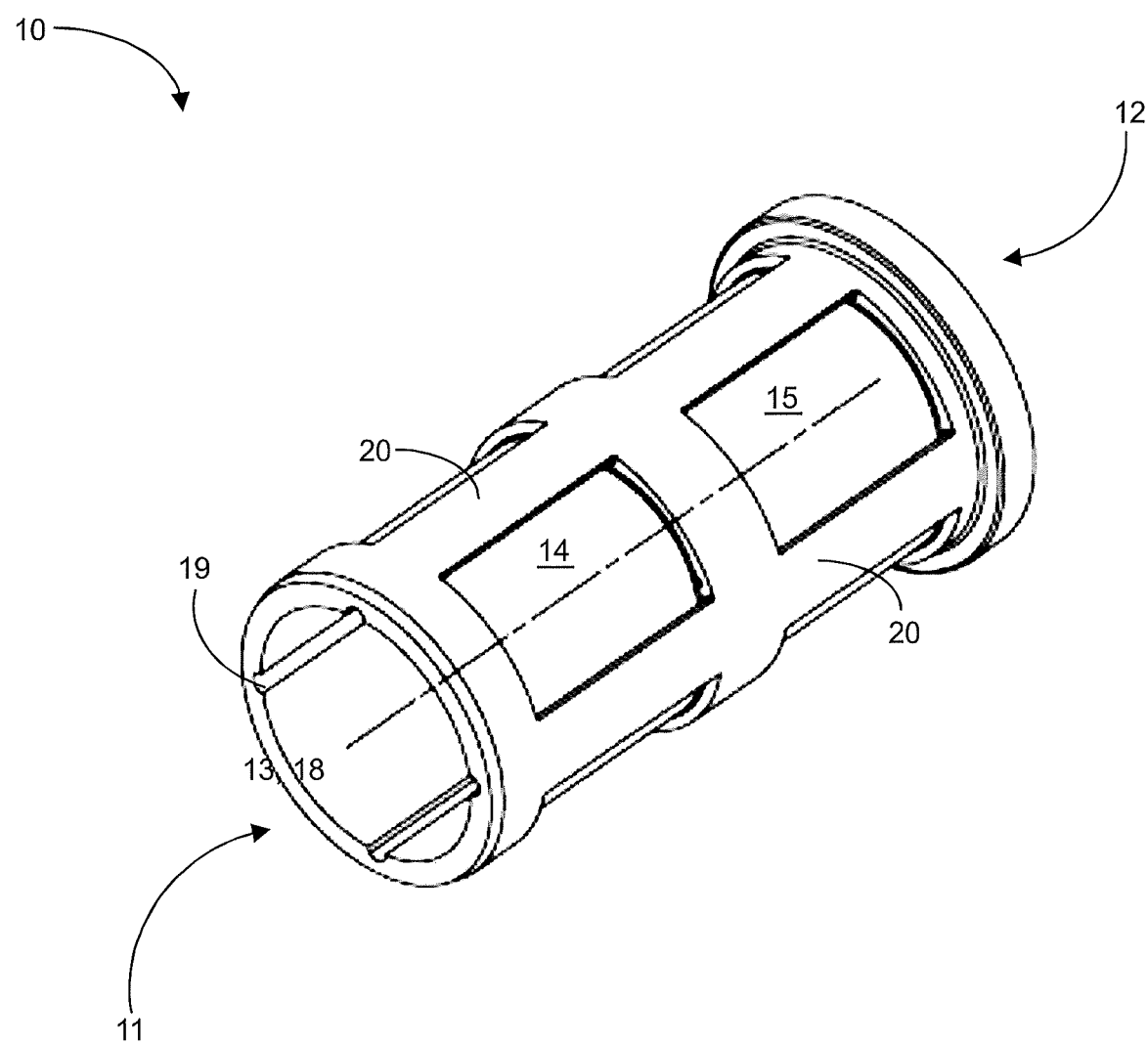
FIG. 2 illustrates a perspective view of the expansion sleeve of FIG. 1.
Figure 3:
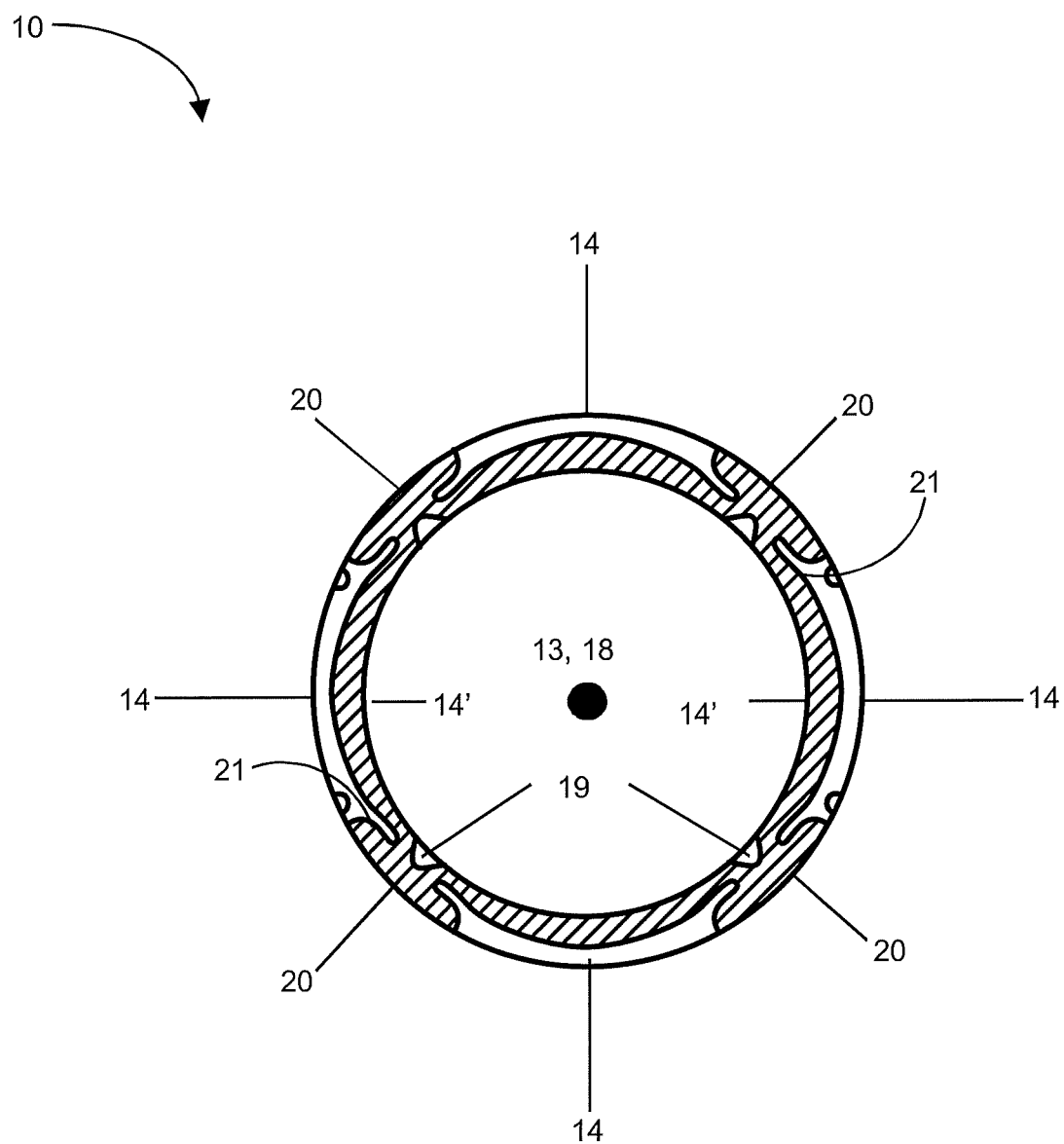
FIG. 3 illustrates a cross-sectional view of fluid chambers of the expansion sleeve of FIG. 2.

FIG. 2 illustrates a perspective view of the expansion sleeve of FIG. 1. As illustrated in FIG. 2, the fluid chambers 14, 15 of the first and second sets are defined by ridges 20 extending along the longitudinal axis 13 of the expansion sleeve 10. In addition to defining fluid chambers, the ridges 20 can engage the central bore of a tool holder body, such as the bore of a chuck body. The ridges 20, for example, can engage the central bore of a tool holder via interference fit, press fit, soldering or any combination thereof. Accordingly, the ridges can exhibit sufficient surface area for engagement with bore surfaces of the tool holder body. In some embodiments, the ridges comprise one or more undercuts. Undercuts can enable the ridges to exhibit sufficient surface area while also expanding surface area of the fluid chambers. FIG. 3 illustrates a cross-sectional view of fluid chambers of the expansion sleeve of FIG. 2. Each ridge 20 comprises undercuts 21 permitting extension of the fluid chambers 14 under the outer surface area of the ridges 20. Additionally, bottom walls 14' of the chambers exhibit thickness gradients, in some embodiments. In the embodiment of FIG. 3, bottom wall 14' thickness is greater in a central region of the wall compared to peripheral regions of the wall. Bottom wall 14' thickness is at minimum in the undercut 21 regions of the fluid chamber 14 and at a maximum in the central region. This arrangement can assist in reducing stiffness in corners, enabling the sleeve 10 to expand in a more uniform shape. In other embodiments, bottom wall 14' thickness can be generally uniform. In the embodiment of FIG. 3, the grooves 19 along the bore surface 18' are aligned with the ridges 20. Such alignment can also reduce stiffness, enabling the sleeve 10 to expand in a more uniform shape. In alternative embodiments, grooves 19 along the bore surface 18' do not align with the ridges. The grooves, for example, can reside in chamber bottom walls 14'.

Figure 4:
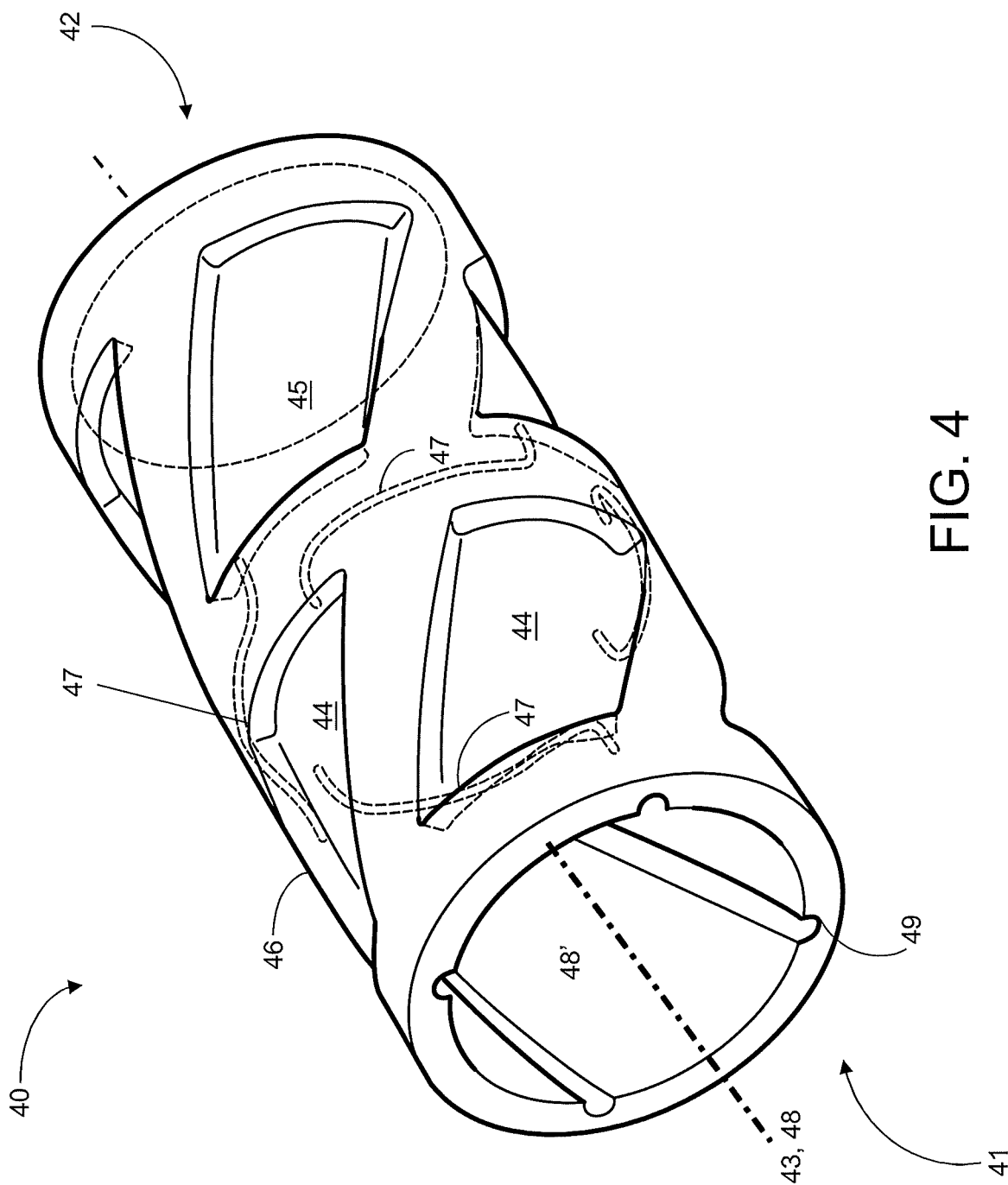
FIG. 4 illustrates a perspective cut-away view of an expansion sleeve according to some embodiments.

FIG. 4 illustrates a perspective cut-away view of an expansion sleeve according to another embodiment. As illustrated in FIG. 4, the expansion sleeve 40 comprises a first end 41, a second end 42 and a longitudinal axis 43 extending along a bore 48 between the first end 41 and the second end 42. A first set of fluid chambers 44 are proximate the first end 41 and a second set of fluid chambers 45 are proximate the second end 42. Fluid chambers 44 of the first set are circumferentially arranged over the outer surface 46 of the expansion sleeve 10. Similarly, fluid chambers 45 of the second set are circumferentially arranged over the outer surface 46 of the expansion sleeve 10. In the embodiment of FIG. 4, the fluid chambers 44, 45 extend helically along the longitudinal axis 43. Each chamber 44 of the first set can be independently connected with a fluid chamber 45 of the second set via an independent fluid channel 47, wherein the connected chambers exhibit radial offset. As described herein radial offset between connected chambers of the first and second sets can be less than 180 degrees, greater than 180 degrees or range from 170 degrees to 190 degrees. In some embodiments, radial offset between connected first 44 and second 45 chambers is about 180 degrees.

Figure 5:
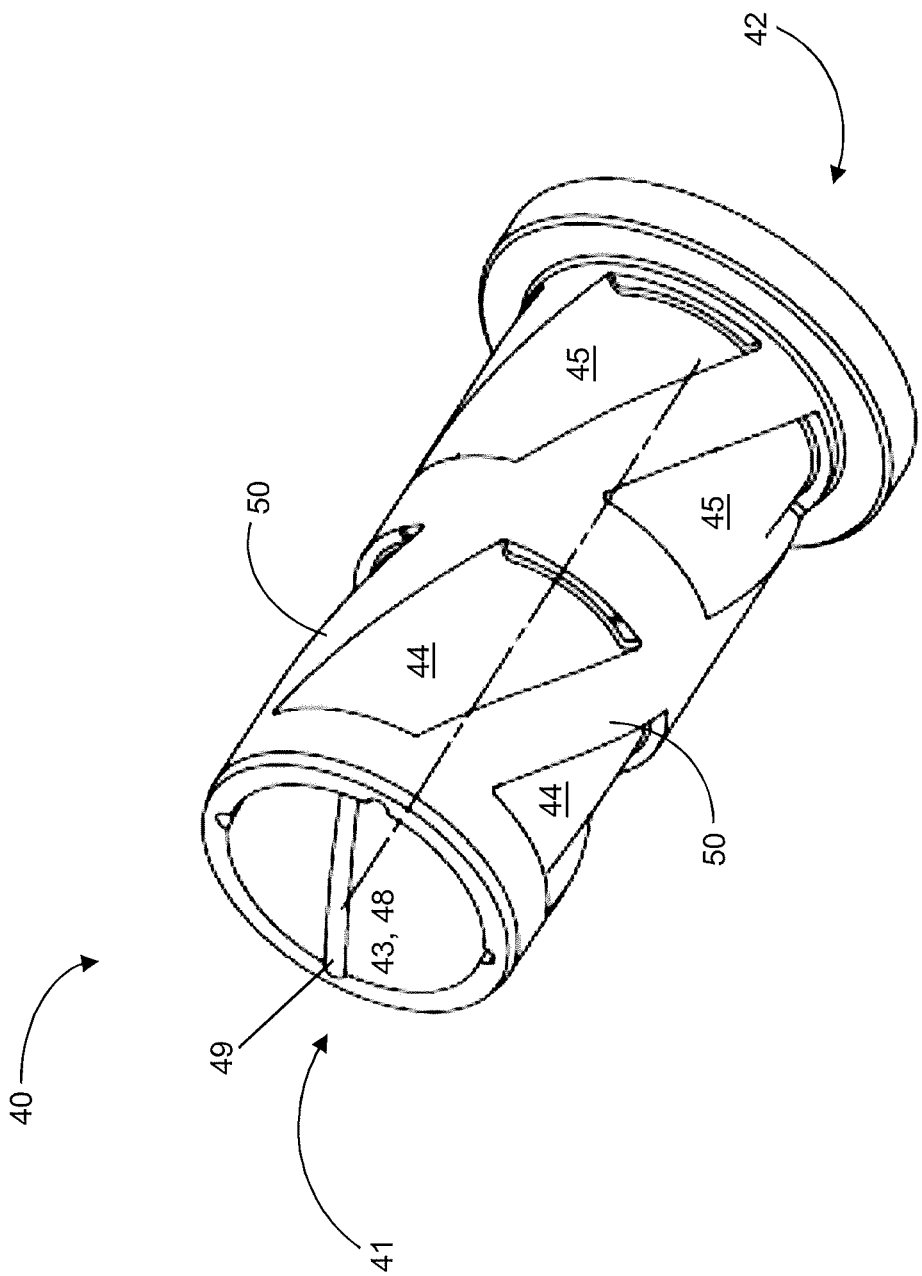
FIG. 5 illustrates a perspective view of the expansion sleeve of FIG. 4.

The expansion sleeve of FIG. 4 also comprises grooves 49 extending along the bore surface 48'. The grooves 19 extend helically along the bore surface 48' and can transport coolant to the rotary cutting tool during cutting operations. FIG. 5 illustrates a perspective view of the expansion sleeve of FIG. 4. As illustrated in FIG. 5, the fluid chambers 44, 45 of the first and second sets are defined by ridges 50 extending along the longitudinal axis 43 of the expansion sleeve 10. As the chambers 44, 45 extend helically, the ridges 50 also extend helically along the longitudinal axis 43. In addition to defining fluid chambers, the ridges 50 can engage the central bore of a tool holder body, such as the bore of a chuck body.

Figure 6:
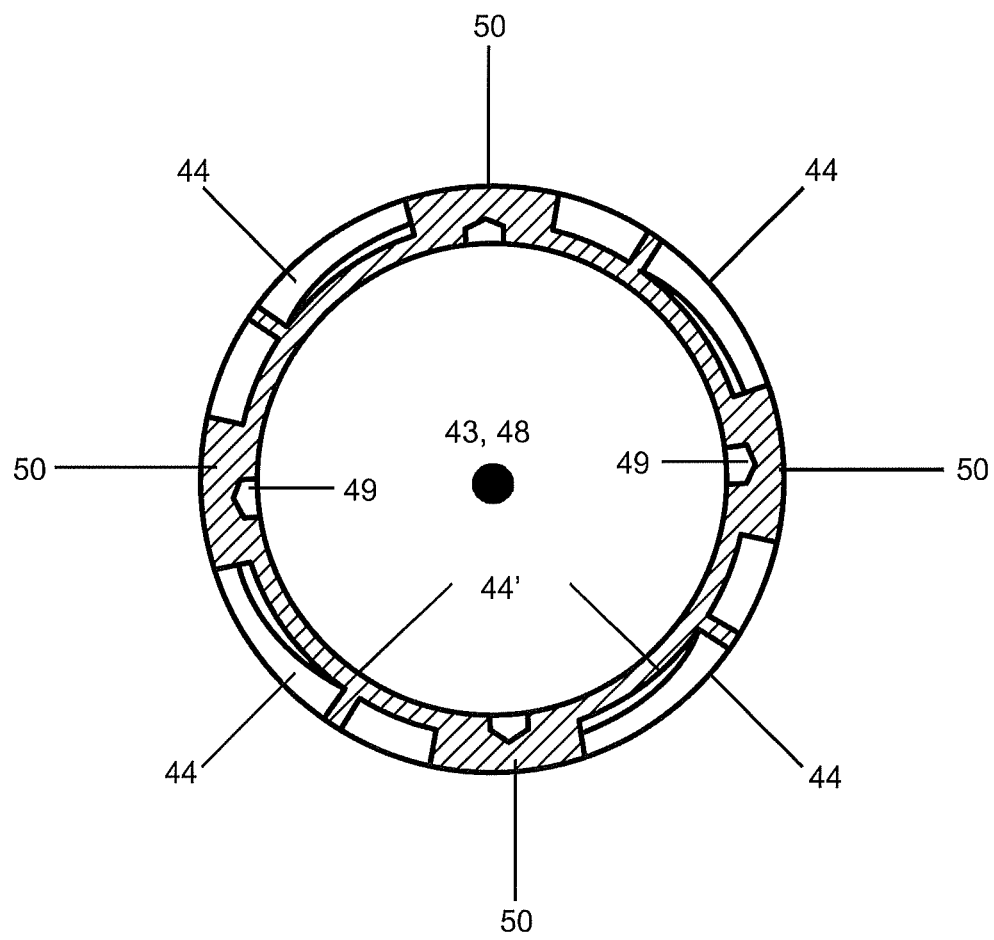
FIG. 6 is a cross-sectional view of fluid chambers of the expansion sleeve of FIG. 5.

FIG. 6 is a cross-sectional view of fluid chambers of the expansion sleeve of FIG. 5. As illustrated in FIG. 6, the chambers 44 are defined and separated by the ridges 50. In contrast to FIG. 3, the ridges do not employ undercuts, and bottom walls 44' of the chambers are uniform or substantially uniform in thickness. The grooves 49 along the bore surface 48' are aligned with the ridges 50. Such alignment can also reduce stiffness, enabling the sleeve 10 to expand in a more uniform shape. In alternative embodiments, grooves 49 along the bore surface 48' do not align with the ridges. The grooves, for example, can reside in chamber bottom walls 44'.

In another aspect, an expansion sleeve for tool holder apparatus comprises a first end, a second end and a longitudinal axis extending along a bore between the first end and the second end. Independent fluid chambers extend between the first end and the second end and are radially arranged around the bore. In some embodiments, two or more of the independent fluid chambers are connected by fluid channels. Independent fluid chambers connected by fluid channels can be radially adjacent to one another. Alternatively, independent fluid chambers connected by fluid channels are radially spaced from one another. Radial spacing of connected fluid chambers can be selected according to several considerations including, but not limited to, the total number fluid chambers present and geometry of the fluid chambers. In some embodiments, the fluid chambers extend helically along the longitudinal axis from the first end to the second end of the expansion sleeve. In other embodiments, fluid chambers extend linearly along the longitudinal axis from the first end to the second end.

Figure 7:
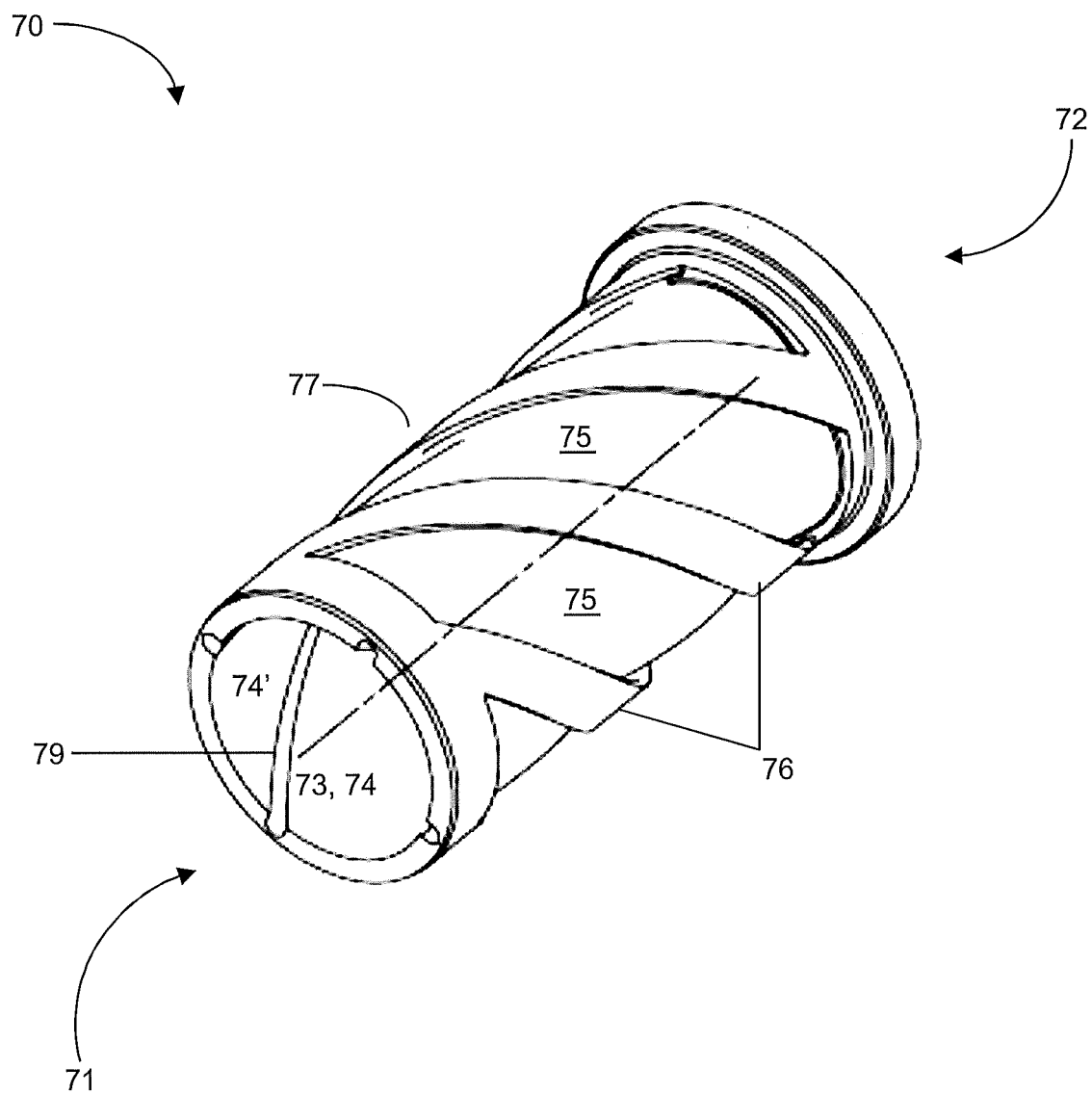
FIG. 7 illustrates a perspective view of an expansion sleeve according to some embodiments.

FIG. 7 illustrates a perspective view of an expansion sleeve according to some embodiments. The expansion sleeve 70 comprises a first end 71, a second end 72 and a longitudinal axis or central axis 73 extending along a bore 74 between the first 71 and second 72 ends. A plurality of independent fluid chambers 75 extend between the first end 71 and the second end 72 and are radially arranged around the bore 74. In the embodiment of FIG. 7, four independent fluid chambers are present. However, any desired number of fluid chambers is possible including, 3, 6, 8 or more than 8.

Ridges 76 extending helically along the outer surface 77 of the expansion sleeve 70 define the helical fluid chambers 75. In alternative embodiments, the ridges can extend linearly to define linear fluid chambers. As described herein, the ridges 76 can engage the central bore of a tool holder body, such as the bore of a chuck body. The ridges can exhibit sufficient surface area for engagement with bore surfaces of the tool holder body. In some embodiments, the ridges comprise one or more undercuts. Undercuts can enable the ridges to exhibit sufficient surface area while also expanding surface area of the fluid chambers. For example, the expansion sleeve 70 of FIG. 7 can exhibit a cross-sectional profile consistent with that illustrated and described in FIG. 3. The expansion sleeve of FIG. 7 also comprises grooves 79 extending along the bore surface 74'. The grooves 79 extend helically along the bore surface 74' and are aligned with the ridges 76. The grooves 79 can transport coolant to the rotary cutting tool during cutting operations.

Figure 9:
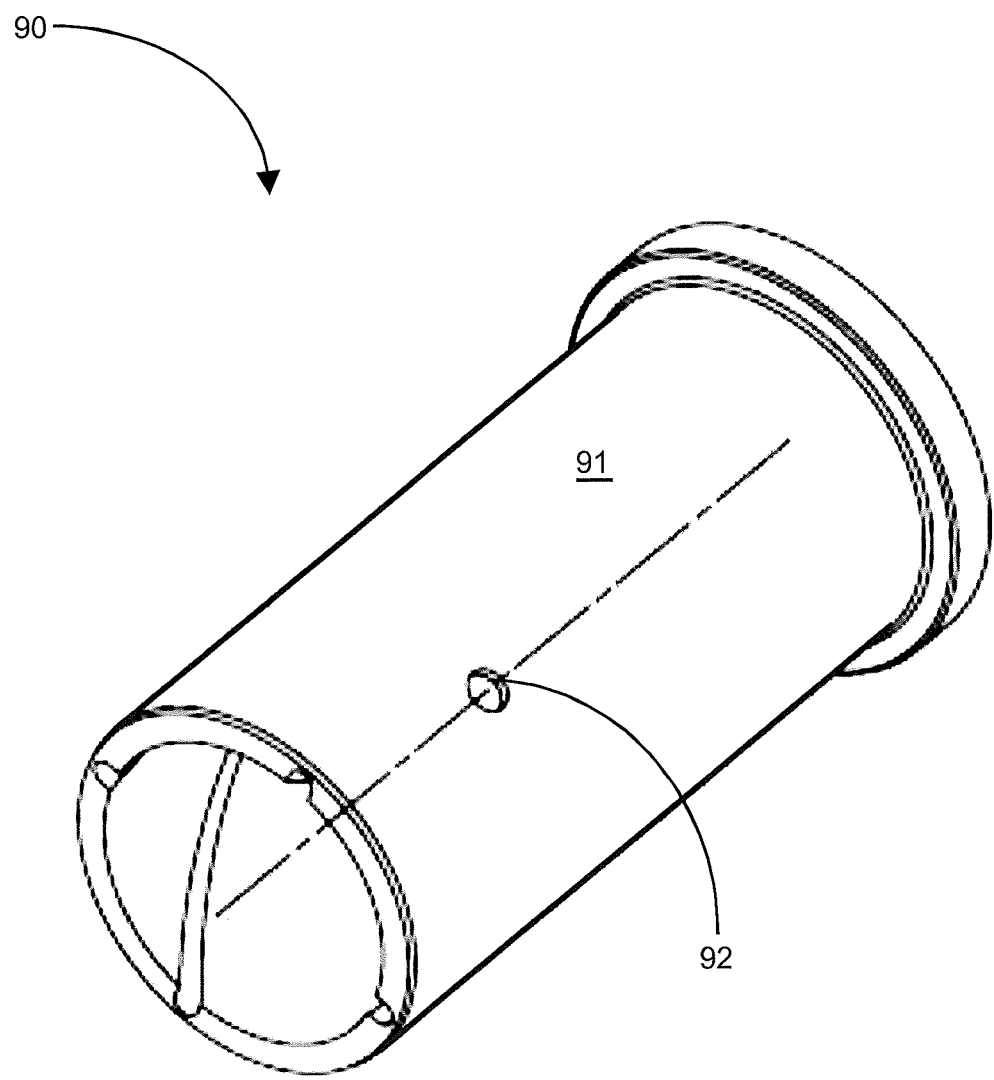
FIG. 9 illustrates a perspective view of an expansion sleeve according to some embodiments.
Figure 10:
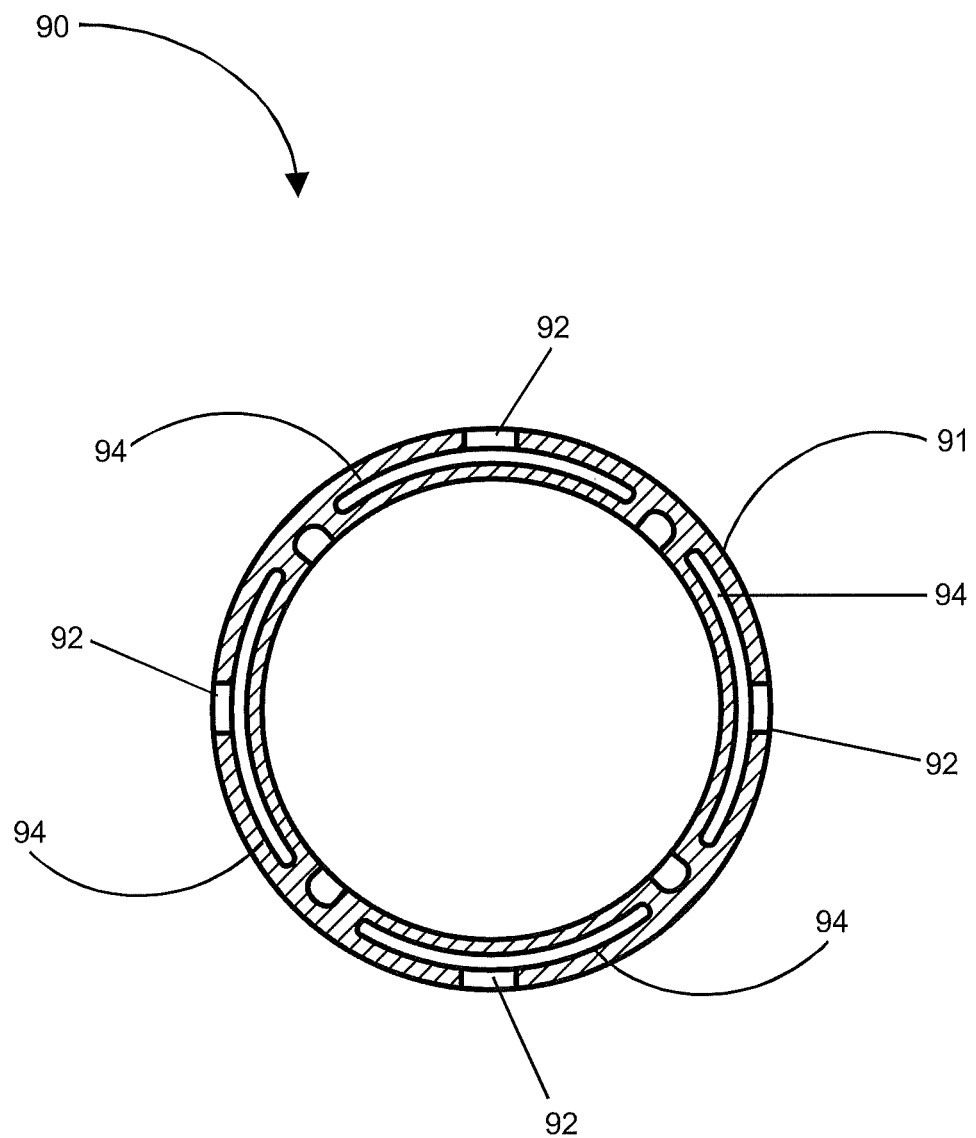
FIG. 10 illustrates a cross-sectional view of the expansion sleeve of FIG. 9.

As illustrated in the embodiments of FIGS. 1, 2, 4 and 5, the fluid chambers exhibit an open configuration. However, in some embodiments, fluid chambers of the expansion sleeve can be covered or have an enclosed configuration. For example, one or more outer walls can enclose the fluid chambers 14, 15 of FIGS. 1 and 2. Similarly, one more outer walls can also enclose the fluid chambers 44, 45 of FIGS. 4 and 5. FIG. 9 illustrates a perspective view of an expansion sleeve wherein the fluid chambers exhibit an enclosed configuration. In particular, FIG. 9 comprises the architecture of FIG. 5 wherein an outer wall 91 covers the fluid chambers 44, 45. An aperture 92 in the outer wall 91 is used to supply fluid to one or more of the fluid chambers. In some embodiments, the outer wall 91 comprises multiple apertures 92 for supplying fluid to radially offset fluid chambers. FIG. 10 is a cross-sectional view of the expansion sleeve illustrated in FIG. 9. As provided in FIG. 10, fluid chambers 94 at a first end of the expansion sleeve 90 are enclosed by an outer wall 91. Apertures 92 are present in the outer wall 91 for delivering fluid to the chambers 94. Fluid chambers (not shown) at the second end of the expansion sleeve 90 are also enclosed by the outer wall 92.

In embodiments where an outer wall is present enclosing the fluid chambers, the outer wall can engage the central bore of the chuck in which the expansion sleeve is positioned. The outer wall may engage the central bore via interference fit, press fit, soldering or any combination thereof.

Expansion sleeves of the present application can be fabricated by any technique enabling the technical and structural features described herein. In some embodiments, an expansion sleeve is fabricated by one or more additive manufacturing techniques. Additive manufacturing techniques contemplated herein include, but are not limited to, binder jetting, material jetting, laser powder bed, electron beam powder bed and directed energy deposition as described in ASTM F-42. Additionally, expansion sleeves can be fabricated from any desired material. Material of the expansion sleeve can be selected according to several considerations including, but not limited to, specific design of the expansion sleeve, clamping requirements of the tool holder apparatus, material of the tool holder body and/or compatibility with fabrication techniques, including additive manufacturing techniques. The expansion sleeve, in some embodiments, is fabricated from the same material as the tool holder body. In other embodiments, the expansion sleeve and tool holder body are comprise different materials. For example, the expansion sleeve can be constructed of material(s) having low thermal conductivity, which can reduce heat transfer to the chambers and prevent the fluid, such as hydraulic fluid, organic fluid or silicone fluid, from overheating during cutting operations. In some embodiments, the expansion sleeve is fabricated from steel, such as tool steel. In other embodiments, the expansion sleeve is fabricated from cobalt-based alloy, nickel-based alloy or various iron-based alloys. Alternatively, the expansion sleeve can be fabricated from sintered cemented carbide, such as tungsten carbide with an iron-group binder. In some embodiments, the expansion sleeve is fabricated via additive manufacturing from carbide powder compositions described in U.S. patent application Ser. No. 15/437,153, which is incorporated herein by reference in its entirety.

In another aspect, chucks are provided, including hydraulic chucks. In some embodiments, a chuck comprises a body comprising a central bore and an expansion sleeve positioned in the central bore, the expansion sleeve having a first end, a second end and longitudinal axis extending between the first end and the second end. A first set of expansion chambers are proximate the first end of the sleeve and a second set of expansion chambers are proximate the second end, wherein fluid channels extend along the longitudinal axis to connect radially offset expansion chambers of the first and second sets. In some embodiments, each expansion chamber of the first set can be independently connected with an expansion chamber of the second set via an independent fluid channel, wherein the connected chambers are radially offset from one another. In this way, fluid such as hydraulic fluid, organic fluid or silicone fluid, is shared between expansion chamber pairs and does not reside in a single circumferential chamber as in prior hydraulic chuck designs. Limiting fluid to expansion chamber pairs can limit fluid displacement when a force is applied to the tool held by the chuck, thereby increasing radial stiffness and grip of the chuck. In some embodiments, the chuck employs an independent fluid feed line for each of the connected expansion chambers. An independent feed line for each of the connected expansion chambers can be coupled to a reservoir of fluid common to all the independent feed lines. In such embodiments, a single piston can pressurize the common reservoir of fluid. In this case, the piston closes the different fluid feed lines to the reservoir after pressurizing, preventing fluid communication between the feed lines. In other embodiments, the independent fluid feed line for each of the connected expansion chambers is coupled to an independent reservoir of fluid. Independent reservoirs of fluid can be pressurized by independent pistons.

As described herein, the expansion sleeve can be positioned in the central bore of the chuck via interference fit, press fit, brazing, soldering or any combination thereof. Alternatively, the chuck and expansion sleeve can be fabricated as a single, monolithic or continuous piece. An expansion sleeve having any architecture and/or properties described above can be fabricated as a single-piece with the chuck by any suitable technique, including additive manufacturing techniques contemplated herein.

Figure 8:
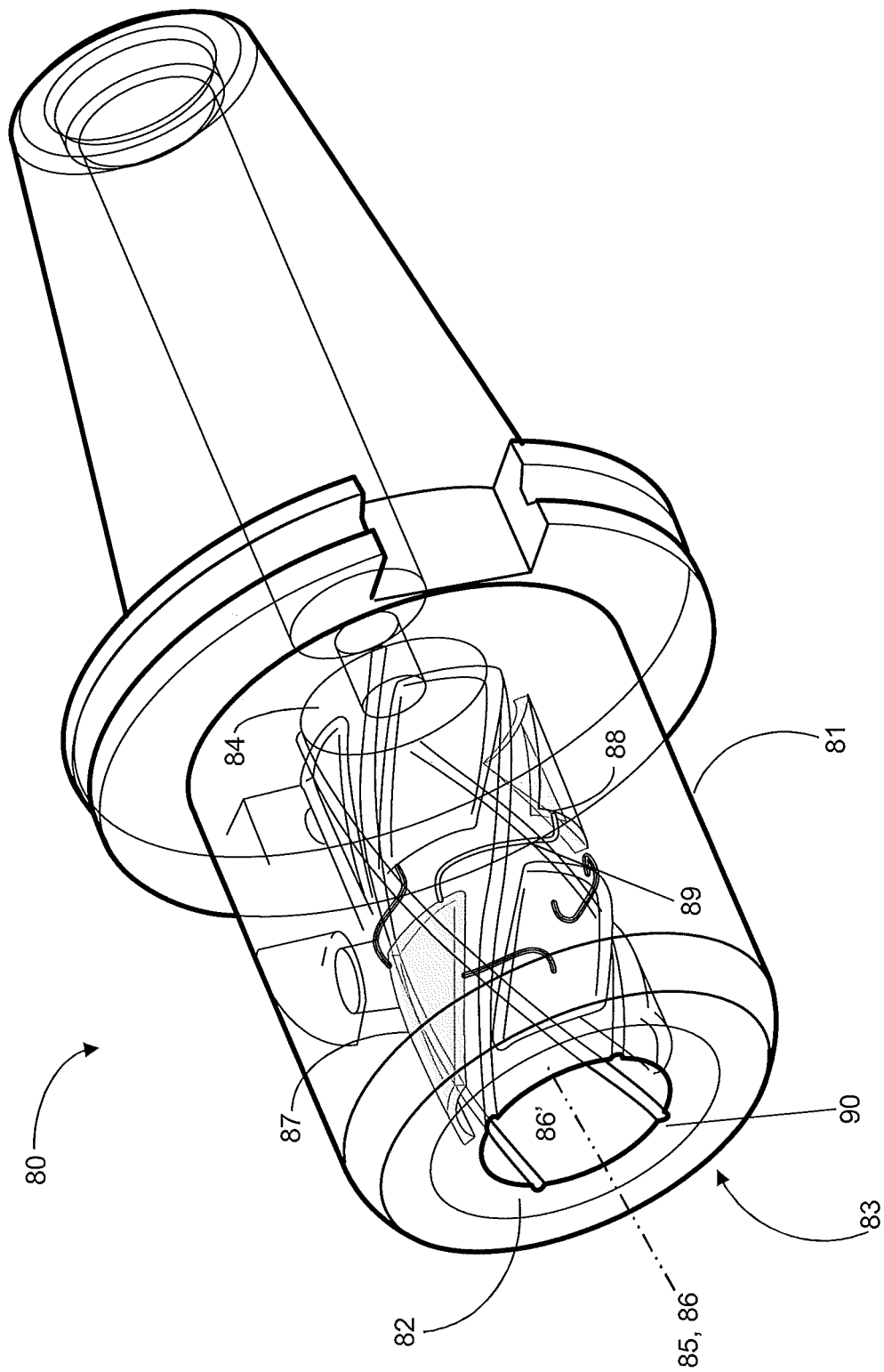
FIG. 8 illustrates a cut-away perspective view of a chuck according to some embodiments.

FIG. 8 illustrates a cut-away perspective view of a chuck according to some embodiments. The chuck 80 comprises a chuck body 81 and an expansion sleeve 83 positioned in the body 81. The expansion sleeve 82 comprises a first end 83, a second end 84 and a longitudinal axis 85 extending along a bore 86 between the first end 83 and the second end 84. A first set of expansion chambers 87 are proximate the first end 83 and a second set of expansion chambers 88 are proximate the second end 84. Expansion chambers 87 of the first set are circumferentially arranged relative to the bore 86 of the expansion sleeve 83. Similarly, expansion chambers 88 of the second set exhibit a circumferential arrangement relative to the bore 86. In the embodiment of FIG. 8, the expansion chambers 87, 88 extend helically along the longitudinal axis 85. Each expansion chamber 87 of the first set can be independently connected with an expansion chamber 88 of the second set via an independent fluid channel 89, wherein the connected chambers are radially offset from one another. The radial offset in FIG. 8 is about 180 degrees. Additionally, grooves 90 extend helically along the bore surface 86' and are operable for delivery of coolant. The expansion sleeve 82, in some embodiments, is brazed or soldered into the tool holder or chuck body 81. Alternatively, the expansion sleeve 82 can be coupled with the chuck body 81 via interference fit or press fit.

In a further aspect, a chuck comprises a body comprising a central bore and an expansion sleeve positioned in the central bore, the expansion sleeve having a first end, a second end and a central axis extending between the first end and the second end. Independent expansion chambers extend between the first end and the second end and are radially arranged around the central axis. In this way, fluid does not reside in a single circumferential chamber as in prior hydraulic chuck designs. Limiting fluid to multiple independent expansion chambers radially arranged around the central axis can limit fluid displacement, thereby increasing radial stiffness and grip of the chuck. In some embodiments, two or more of the independent expansion chambers are connected by fluid channel(s). Expansion chambers connected by fluid channel(s) can be adjacent to one another or radially spaced apart. Additionally, the chuck can employ an independent fluid feed line for each of the independent expansion chambers. An independent fluid feed line for each of the expansion chambers can be coupled to a reservoir of fluid, such as hydraulic fluid, organic fluid or silicone fluid, common to all the feed lines. In such embodiments, a single piston can pressurize the common reservoir of fluid and close the line precluding fluid transfer between the chambers. In other embodiments, the independent fluid feed line for each of the expansion chambers is coupled to an independent reservoir of fluid. Independent reservoirs of fluid can be pressurized by independent pistons.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. An expansion sleeve for pressure activated tool holder apparatus comprising: a first end, a second end, and a longitudinal axis extending along a bore between the first end and the second end; a first set of fluid chambers proximate the first end and a second set of fluid chambers proximate the second end, wherein each of the fluid chambers of the first set of fluid chambers are fluid independent of one another and wherein each of the fluid chambers of the second set of fluid chambers are fluid independent of one another; wherein fluid channels extend along the longitudinal axis to connect radially offset fluid chambers of the first and second sets; and wherein the fluid chambers of the first and second sets are defined by ridges along an outer surface of the expansion sleeve.

2. The expansion sleeve of claim 1, wherein the connected fluid chambers of the first and second sets are radially offset by less than 180 degrees.

3. The expansion sleeve of claim 1, wherein the connected fluid chambers of the first and second sets are radially offset by greater than 180 degrees.

4. The expansion sleeve of claim 1, wherein the connected fluid chambers of the first and second sets are radially offset by 170 degrees to 190 degrees.

5. The expansion sleeve of claim 1, wherein the fluid chambers of the first and second sets extend linearly along the longitudinal axis.

6. The expansion sleeve of claim 1, wherein the fluid chambers of the first and second sets extend helically along the longitudinal axis.

7. The expansion sleeve of claim 1, wherein the ridges extend linearly along the longitudinal axis.

8. The expansion sleeve of claim 1, wherein the ridges extend helically along the longitudinal axis.

9. The expansion sleeve of claim 1 further comprising grooves along a bore surface for transporting coolant.

10. The expansion sleeve of claim 9, wherein the grooves extend helically along the bore surface.

11. The expansion sleeve of claim 1 having a single piece construction.

12. The expansion sleeve of claim 1, wherein the first set of fluid chambers and second set of fluid chambers have dimensions larger than the fluid channels.

13. An expansion sleeve for pressure activated tool holder apparatus comprising: a first end, a second end, and a longitudinal axis extending along a bore between the first end and the second end; a first set of fluid chambers proximate the first end and a second set of fluid chambers proximate the second end, wherein each of the fluid chambers of the first set of fluid chambers are fluid independent of one another and wherein each of the fluid chambers of the second set of fluid chambers are fluid independent of one another; wherein fluid channels extend along the longitudinal axis to connect radially offset fluid chambers of the first and second sets; and wherein the connected fluid chambers of the first and second sets are radially offset by greater than 180 degrees.

14. The expansion sleeve of claim 13, wherein the fluid chambers of the first and second sets extend linearly along the longitudinal axis.

15. The expansion sleeve of claim 13, wherein the fluid chambers of the first and second sets extend helically along the longitudinal axis.

16. An expansion sleeve for pressure activated tool holder apparatus comprising: a first end, a second end, and a longitudinal axis extending along a bore between the first end and the second end; a first set of fluid chambers proximate the first end and a second set of fluid chambers proximate the second end, wherein each of the fluid chambers of the first set of fluid chambers are fluid independent of one another and wherein each of the fluid chambers of the second set of fluid chambers are fluid independent of one another; wherein fluid channels extend along the longitudinal axis to connect radially offset fluid chambers of the first and second sets; and wherein the connected fluid chambers of the first and second sets are radially offset by 170 degrees to 190 degrees.

17. The expansion sleeve of claim 16, wherein the fluid chambers of the first and second sets extend linearly along the longitudinal axis.

18. The expansion sleeve of claim 16, wherein the fluid chambers of the first and second sets extend helically along the longitudinal axis.

\* \* \* \* \*